US008055759B2

(12) United States Patent
Gupta et al.

(10) Patent No.: US 8,055,759 B2
(45) Date of Patent: Nov. 8, 2011

(54) DETERMINATION OF LINK QUALITIES BETWEEN AN ACCESS POINT AND A PLURALITY OF CLIENTS

(75) Inventors: Mukesh Gupta, Milpitas, CA (US);
Devabhaktuni Srikrishna, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 1121 days.

(21) Appl. No.: 11/522,882

(22) Filed: Sep. 18, 2006

(65) Prior Publication Data
US 2008/0071919 A1 Mar. 20, 2008

(51) Int. Cl.
*G06F 15/173* (2006.01)
(52) U.S. Cl. ............... 709/224; 455/456.1; 370/328
(58) Field of Classification Search .......... 370/349, 370/352, 248, 395.2, 329, 338; 455/456.1, 455/439; 709/242
See application file for complete search history.

(56) References Cited

U.S. PATENT DOCUMENTS

| | | | | |
|---|---|---|---|---|
| 5,768,531 A * | 6/1998 | Lin | | 709/242 |
| 6,643,289 B1 * | 11/2003 | Natanson et al. | | 370/395.2 |
| 6,697,354 B1 * | 2/2004 | Borella et al. | | 370/352 |
| 7,184,777 B2 * | 2/2007 | Diener et al. | | 455/456.1 |
| 7,463,624 B2 * | 12/2008 | Kitazawa | | 370/352 |
| 7,545,787 B2 * | 6/2009 | Bitran et al. | | 370/338 |
| 2004/0001474 A1 * | 1/2004 | Simelius et al. | | 370/349 |
| 2004/0202141 A1 | 10/2004 | Sinivaara et al. | | |
| 2004/0218568 A1 | 11/2004 | Goodall et al. | | |
| 2004/0236850 A1 | 11/2004 | Krumm et al. | | |
| 2005/0090259 A1 * | 4/2005 | Jain et al. | | 455/439 |
| 2005/0281204 A1 * | 12/2005 | Karol et al. | | 370/248 |
| 2007/0019610 A1 * | 1/2007 | Backholm et al. | | 370/349 |
| 2008/0130560 A1 * | 6/2008 | Khandekar et al. | | 370/329 |

* cited by examiner

*Primary Examiner* — Dustin Nguyen
(74) *Attorney, Agent, or Firm* — Brian R. Short

(57) ABSTRACT

An apparatus and method of determining link qualities of a plurality of links between an access point and a plurality of client devices is disclosed. The method includes detecting all client devices associated with the access point. A list of the associated client devices is generated. The access point transmits keep alive packets according to the list. The access point counts responds to the keep alive packets from each of the client devices. The access point estimates a link quality between the access point and each client device based on the counted responses. An apparatus and method of determining link qualities of a plurality of links between an access node of a wireless mesh network and a plurality of client devices is also disclosed. The method includes detecting all client devices associated with the access node. A list of the associated client devices is generated. The access node transmits keep alive packets to each of the associated client devices according to the list. The access point counts responds to the keep alive packets from each of the client devices. The access point estimates a link quality between the access point and each client device based on the counted responses.

19 Claims, 5 Drawing Sheets

DETERMINATION OF LINK QUALITIES BETWEEN AN ACCESS POINT AND A PLURALITY OF CLIENTS

FIELD OF THE INVENTION

The invention relates generally to wireless communications. More particularly, the invention relates to a method and apparatus for determining link qualities between an access point and a plurality of clients.

BACKGROUND OF THE INVENTION

Wireless networks are gaining popularity because wireless infrastructures are typically easier and less expensive to deploy than wired networks. However, wireless networks can be susceptible to environmental conditions, interference and self-interference.

Access points of wireless networks can provide client devices with wireless access to the networks. For example, FIG. 1 shows a wireless network in which client devices 150, 152, 154, 156 are provided with wireless connections to access points 120, 122, 124. The access points 120, 122, 124 are typically wire connected to a wired network 110 that is connected to the internet 100. Because the links between the access points 120, 122, 124 and the client devices 150, 152, 154, 156 are wireless, the links can be susceptible to the previously mentioned environmental conditions, interference and self-interference.

Providing the access points and client devices with knowledge of the quality of the links between the access points and the client devices, allows operators of the access points and/or the client devices to proactively take actions to improve the quality of the links. For example, identification of a poor link can be communicated to a client device operator allowing the operator to adjust the location of the client device or adjust an antenna of the client device, thereby improving the quality of the link. Client device link qualities can also be monitored by a network manager.

It is desirable to provide measurement and analysis of link qualities of client devices association with an access point of a wireless network, without adversely effecting the operation of the wireless network.

SUMMARY OF THE INVENTION

One embodiment of the invention includes a method of determining link qualities of a plurality of links between an access point and a plurality of client devices. The method includes detecting all client devices associated with the access point. A list of the associated client devices is generated. The access point transmits keep alive packets according to the list. The access point counts responses to the keep alive packets from each of the client devices. The access point estimates a link quality between the access point and each client device based on the counted responses.

Another embodiment of the invention includes a method of determining link qualities of a plurality of links between an access node of a wireless mesh network and a plurality of client devices. The method includes detecting all client devices associated with the access node. A list of the associated client devices is generated. The access node transmits keep alive packets to each of the associated client devices according to the list. The access point counts responds to the keep alive packets from each of the client devices. The access point estimates a link quality between the access point and each client device based on the counted responses.

Other aspects and advantages of the present invention will become apparent from the following detailed description, taken in conjunction with the accompanying drawings, illustrating by way of example the principles of the invention.

DETAILED DESCRIPTION

Figure 1:
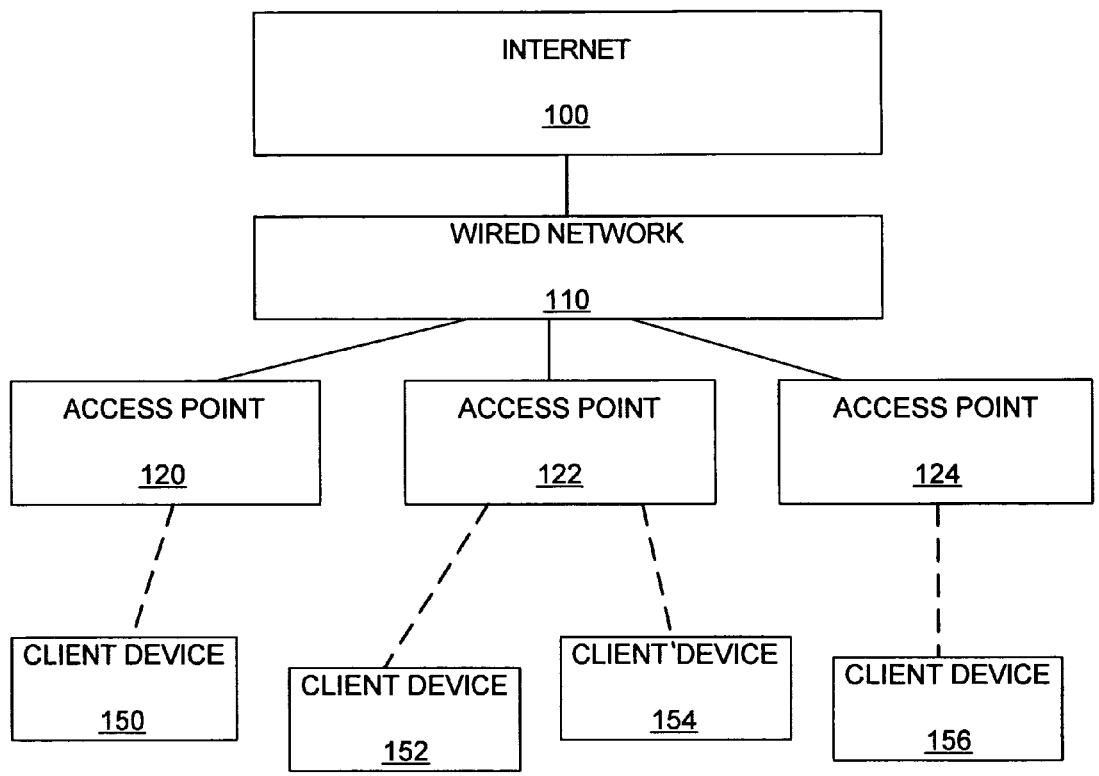
FIG. 1 shows a wireless network in which client devices are provided with wireless connections to access points.

As shown in the drawings for purposes of illustration, the invention is embodied in an apparatus and method for determining link qualities between nodes (access points, access nodes or gateways) and associated clients. The determined link qualities can be used by a network operator to provide suggested improvements in client links if desired.

Figure 2:
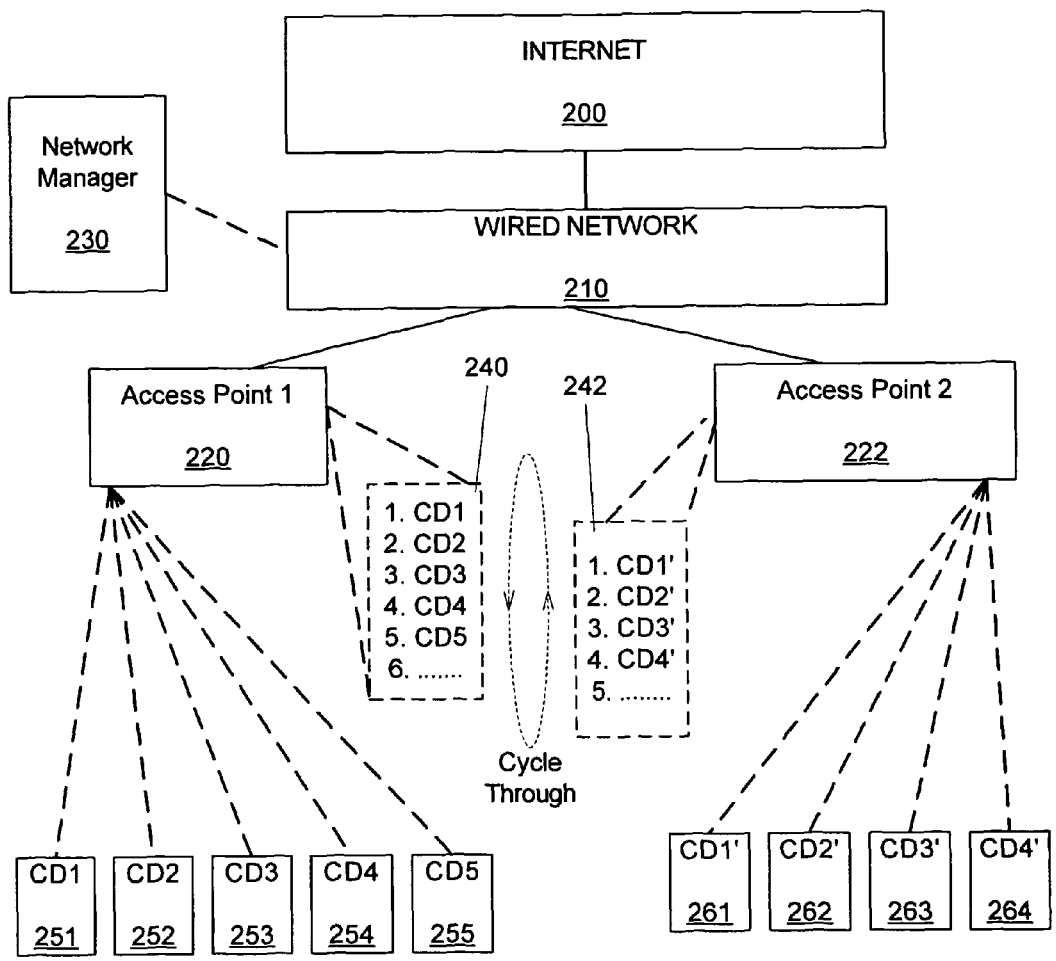
FIG. 2 shows a wireless network in which access points create lists of associated clients, and link qualities between the access point and each of the associated clients are determined using the lists.

FIG. 2 shows a wireless network in which an access points 220, 222 creates an ordered list 240, 242 of associated clients 251, 252, 253, 254, 255, 261, 262, 263, 264 and determines link qualities between the access points 220, 222 and each of the associated clients 251, 252, 253, 254, 255, 261, 262, 263, 264 using the ordered list 240, 242.

The access points 220, 222 provide the clients 251, 252, 253, 254, 255, 261, 262, 263, 264 with wireless access to a wired network 210 that can be connected to the internet 200. The wireless network of FIG. 2 includes two access points 220, 222. However, it is to be understood that the wireless network can include any number of access points.

Each access point 220, 222 detects all of the client devices associated with the access point. Detection of client devices by the access point can accomplished, for example, by a standard 802.11 request and response exchange.

Once the access points 220, 222 have detected the client devices associated with the access point 220, 222, the access points create or generate a list of the client devices. The list can be created by adding each client device to the end of the list as each client device is detected, resulting in the most recently added client being near the end of the list. However, other methods of setting the order of the list can be used.

Each access point determines a quality of each link between the access point and each associated client by transmitting "keep alive" packets, and recording responses to the keep alive packets. Generally, a keep alive packet is a packet transmitted by the access point that prompts the client device for a response.

The access point transmits the keep alive packet according to the list maintained by the access point. An embodiment includes transmitting only one keep alive packet at a time. That is, a keep alive packet is transmitted to one associated client at one period of time, and another keep alive packet is transmitted to one other associated client at a next period of time. The access point cycles through the list transmitting to one associated client at a time, each for a set period (for example, one second). If the set period of time is one second, the access point transmits one keep alive packet to an associated client each second.

It should be understood that the embodiment of the access point transmitting one packet at a time is an example. Other embodiments can include transmitting multiple keep alive packets to multiple client devices during each period of time. The primary feature is that the list is followed.

For one embodiment, the list follows a predetermined order, and the keep alive packets are transmitted according to the order of the list. For another embodiment, the keep alive packets are transmitted randomly from the list. That is, there is not a particular order. The underlying factor is that the air-time or bandwidth occupied by the transmission of the keep alive packets is reduced because only a subset of the total number of client devices on the list are targeted for keep alive packets during each period of time. Again, the sequence can be either ordered or random.

The client generally can be a laptop computer, a personal digital assistant (PDA), a cell-phone, or any other device that includes as interface card adaptable for use with the mesh network of the invention. The client can access the network though wired or wireless connections. Wireless clients can access the network through a MAC (media access control), PHY (physical layer) protocol such as IEEE 802.11. The 802.11 protocol includes authentication and association protocols between client devices and the network. The client device can include a NIC (network interface card). The wireless clients can include a wireless to wired CPE (consumer premises equipment) bridge designed to accept a wireless backhaul connection while providing wire Ethernet connectivity inside a home. The wireless to wired CPE can connect one or more Ethernet-equipped client device (such as laptops or personal computers) to the wireless access network. Such a configuration can be referred to as "clients behind a CPE". The client device can be directly connected (for example, by Ethernet) to an Ethernet port on a wireless mesh access node. For example, the client device could be an IP video camera attached to an Ethernet port of street-light mounted mesh access node. This type of client device can be referred to as a "wired client".

Figure 3:
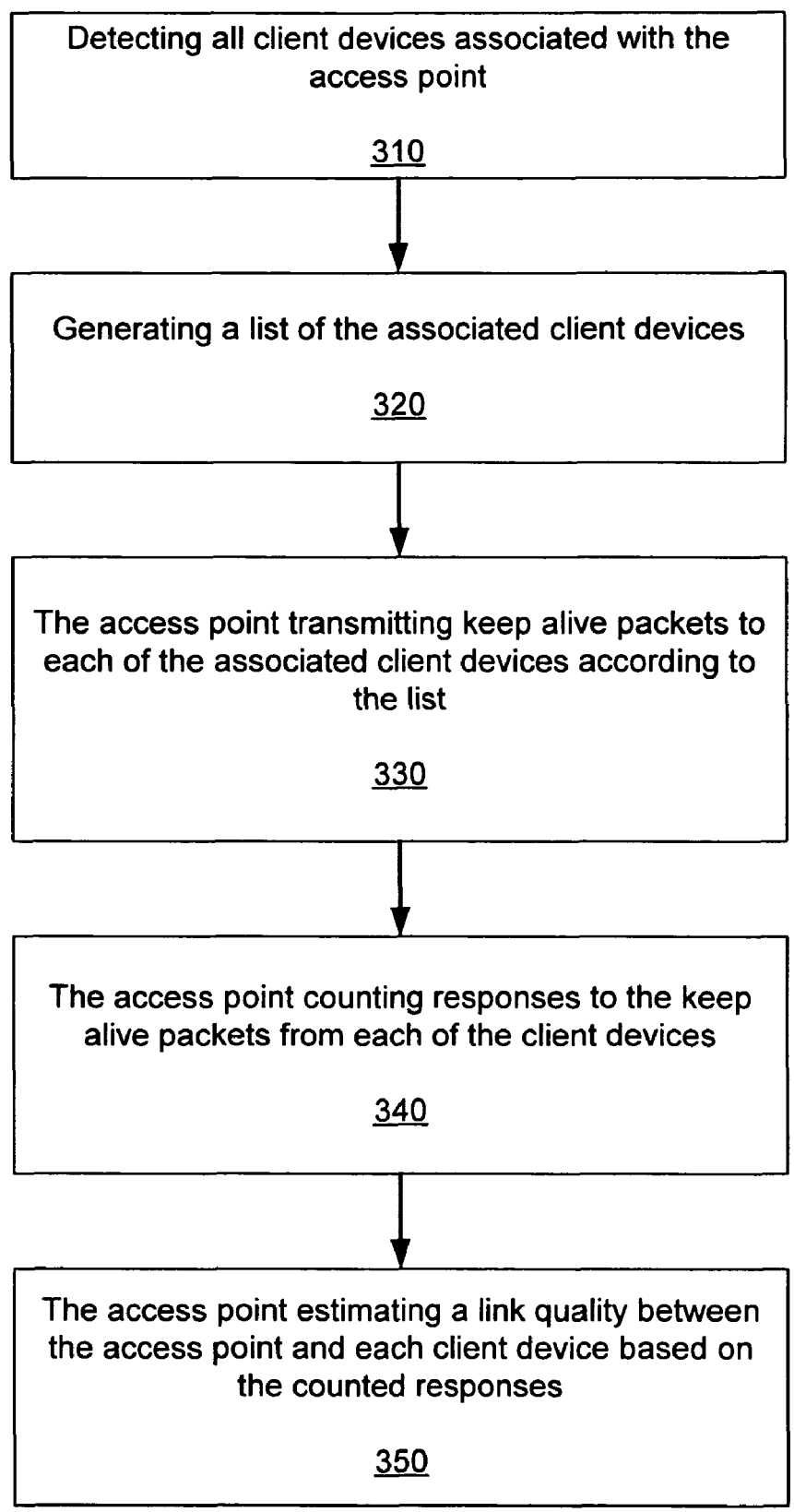
FIG. 3 is a flow chart that shows steps of one example of a method determining link qualities of a plurality of links between an access point and a plurality of client devices.

FIG. 3 is a flow chart that shows steps of one example of a method determining link qualities of a plurality of links between an access point and a plurality of client devices. This method can be used, for example, to determine the qualities of transmission links between the access point and client devices of FIG. 2.

A first step 310 of the method includes detecting all client devices associated with the access point. A second step 320 includes generating a list of the associated client devices. A third step 330 includes the access point transmitting keep alive packets to each of the associated client devices, the access point transmitting the keep alive packets to each of the associated client devices according to the list. A fourth step 340 includes the access point counting responses to the keep alive packets from each of the client devices. A fifth step 350 includes the access point estimating a link quality between the access point and each client device based on the counted responses.

As previously described, detecting the associated clients includes, for example, as association request of a client followed by an association response forming, for example, and 802.11 exchange.

As previously described, the list can be generated by adding each client device as the client device is detected. That is, the list can be ordered by first detected, first on the list.

One embodiment includes the keep alive packets being transmitted one at a time. That is, one example of the access point transmits one keep alive packet per second. Each keep alive packet being transmitted to a different one of the associated client devices as determined by the ordered list. Other embodiments include transmitting a plurality of keep alive packets per second, but following the list. For example, the access point could transmit two or three keep alive packets to multiple client devices. However, the order of the transmission of the keep alive packets should follow the list, whether in an ordered or a random fashion. The main premise is that less than the whole list is transmitted at a time, and that is some way, list is followed.

The quality of the links can be determined by comparing the number of keep alive packets transmitted over a period of time with the number of response to the keep alive packet received over the period of time. Stated differently, the estimates of link quality can be based on a packet success probability as determined by a percentage of keep alive packets sent to each client device that result in a response received by the access point from the client device. A poor link will have a low packet success probability whereas a good link will have a comparatively high packet success probability. The keep alive packets can be transmitted at a predetermined rate (for example, one per second). Knowing the rate of transmission of keep alive packets, and the rate of response received in response to the keep alive packets, allows the access point to estimate the link qualities between the access point and the client devices.

The rate in which keep alive packets are transmitted to any particular client device is generally dependent on the size of the ordered list. If the access point is associated with a large number of client devices, and the number of keep alive packets transmitted by the access point per unit of time is fixed, then the rate in which the access point transmits keep alive packets to each client device will be relatively small. The rate keep alive packets are transmitted to each individual client device is dependent on the rate in which keep alive packets are transmitted, and the number of client devices on the ordered list. Again, the transmission order can be random or ordered, but according to the list.

Exemplary keep alive packets include ARP packets and ICMP echo packets. The keep alive packets prompt a response from the client device which can be used to evaluate the quality of the link between the client and the access node.

Once the link qualities of the client devices associated with the access point are determined, the link qualities can be communicated to a system operator. For example, the network manager 230 can maintain performance parameters of the wireless network. One of the performance parameters can include client device link qualities. A system operator associated with the network manager 230 can communicate the client device link qualities to the client devices. This allows operators of the client devices to be informed of the link qualities, allowing the operators of the client devices to take actions that can improve the quality of the links. If alerted of a poor link quality, the client device can chose, for example, to roam to another access node, or increase the power of its transmission signals. The client device can incorporate consumer premises equipment (CPE) for additional transmission power.

As client devices disassociate with the access point and new client devices associate, the list is updated. If a client device disassociates, the client device can be dropped from the list. However, the order of the list essentially remains in tact. Client disassociation can be determined by either an 802.11 disassociation (that is, the client device transmitting a disassociation frame), or by a lack of any 802.11 frames being received from the client device.

New client devices can be added at either end of the ordered list. That is, a new client device is added at either the beginning of the list, or at the end of the list. By adding the new client at either end, the original order is substantially maintained.

Figure 4:
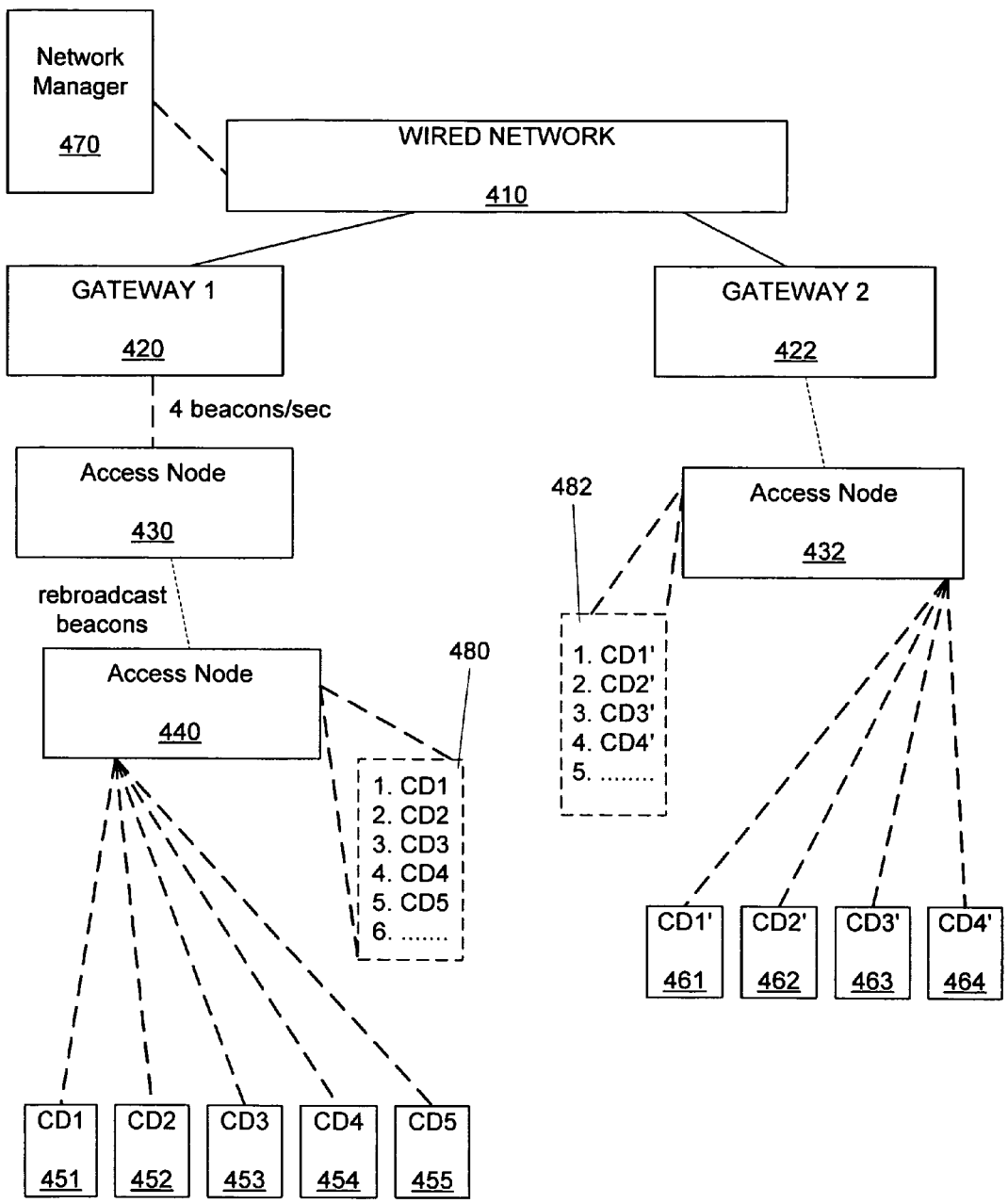
FIG. 4 shows a wireless mesh network in which nodes (access nodes and gateways) create lists of associated client devices, and link qualities between the nodes and each of the associated clients are determined using the ordered lists.

FIG. 4 shows a wireless mesh network in which nodes (access nodes and gateways) create lists of associated client devices, and determines link qualities between the nodes and each of the associated clients using the ordered lists. The wireless mesh network includes gateways 420, 422 and access nodes 430, 432, 440 that provide a network connection between client devices 451-455, 461-464 and a wired network 410. The wired network 410 can be connected to the internet.

Figure 5:
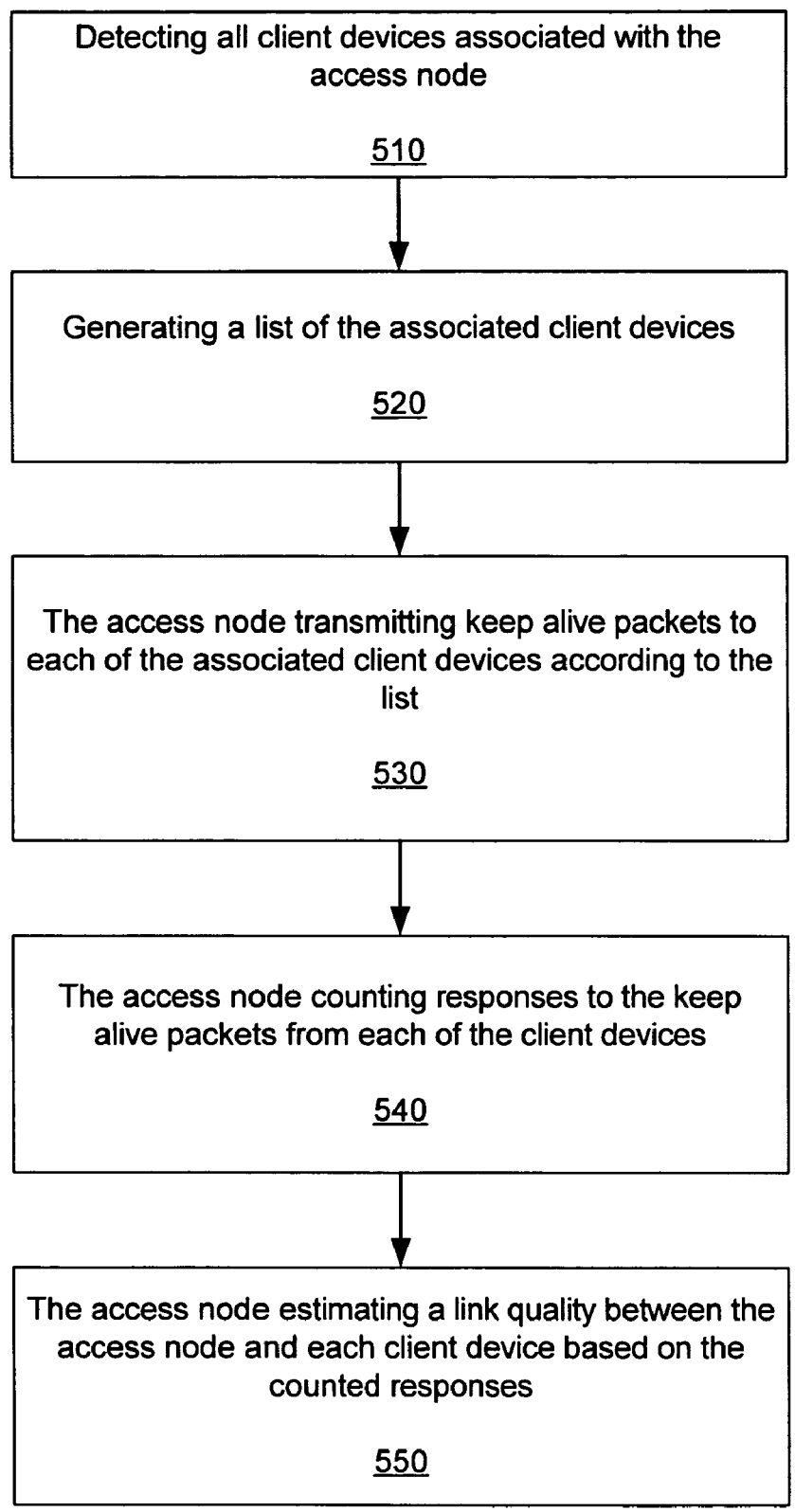
FIG. 5 is a flow chart that shows steps of one example of a method of determining link qualities of a plurality of links between an access node of a wireless mesh network and a plurality of client devices.

FIG. 5 is a flow chart that shows steps of one example of a method of determining link qualities of a plurality of links between an access node of a wireless mesh network and a plurality of client devices. A first step 510 of the method includes detecting all client devices associated with the access node. A second step 520 includes generating a list of the associated client devices. A third step 530 includes the access node transmitting keep alive packets to each of the associated client devices, the access node transmitting the keep alive packets to each of the associated client devices according to the list. A fourth step 540 includes the access node counting responses to the keep alive packets from each of the client devices. A fifth step 550 includes the access node estimating a link quality between the access node and each client device based on the counted responses.

One embodiment includes the estimates of link quality being based on a packet success probability as determined by a percentage of keep alive packets sent to each client device that result in a response received by the access node from the client device. As previously described, the access node transmits the keep alive packets at a predetermined rate. Based upon the predetermined rate, and the rate in which response to the keep alive packets are received, allows determination of packet success probability. The packet success probability can be used as a measure of the quality of the link between the client device and the access node.

The link qualities can be communicated to a system operator, allowing the system operator to identify links that should or could be improved. The link qualities can be communicated to operators of the client devices, allowing the client device operator to change the link by, for example, adding a CPE or associating with a different access point.

The transmission according to the list can be either ordered (as per the list) or randomly. Random transmission can be accomplished by randomly transmitting according to the list.

The list of associated clients can be updated as new client device associate with the access node, and old client disassociate with the access node.

The mesh network includes gateways and access nodes which can more generally be referred to as nodes. It is to be understood that a client device can associate with gateways and/or access nodes. Therefore, both gateways and access nodes can utilize the methods of determining link qualities of a plurality of links between a node of a wireless mesh network and a plurality of client devices.

The methods can be implemented through computer programs operable on processing units within the nodes.

Although specific embodiments of the invention have been described and illustrated, the invention is not to be limited to the specific forms or arrangements of parts so described and illustrated. The invention is limited only by the appended claims.

What is claimed:

1. A method of determining link qualities of a plurality of links between an access point and a plurality of client devices, comprising:
   detecting all client devices associated with the access point, wherein detecting a client device comprises the access point performing a request and response exchange with the client device;
   generating a list of the associated client devices;
   the access point transmitting keep alive packets to each of the associated client devices according to the list;
   the access point counting responses to the keep alive packets from each of the client devices; and
   the access point estimating a link quality of a wireless link between the access point and each client device based on the counted responses; wherein
   the estimates of link quality are based on a packet success probability as determined by a percentage of keep alive packets sent to each client device that result in a response received by the access point from the client device.

2. The method of claim 1, wherein the keep alive packets are transmitted one at a time.

3. The method of claim 1, wherein the list is ordered.

4. The method of claim 1, wherein the access point transmits the keep alive packets randomly from the list.

5. The method of claim 1, wherein the access point transmits the keep alive packets at a predetermined rate.

6. The method of claim 1, wherein the keep alive packets are ARP packets.

7. The method of claim 1, wherein the keep alive packets are ICMP echo packets.

8. The method of claim 1, further comprising communicating the link qualities to a system operator.

9. The method of claim 1, further comprising:
   updating the list as new client devices are detected and old client devices are no longer detected.

10. The method of claim 9, wherein the list is updated by adding new clients at either end of the list.

11. The method of claim 9, wherein the list is updated by deleting old client devices while essentially maintaining the ordered list.

12. A method of determining link qualities of a plurality of links between an access node of a wireless mesh network and a plurality of client devices, comprising:
   detecting all client devices associated with the access point, wherein detecting a client device comprises the access point performing a request and response exchange with the client device;
   generating a list of the associated client devices;
   the access node transmitting keep alive packets to each of the associated client devices according to the list;
   the access node counting responses to the keep alive packets from each of the client devices; and
   the access node estimating a link quality of a wireless link between the access node and each client device based on the counted responses; wherein
   the estimates of link quality are based on a packet success probability as determined by a percentage of keep alive packets sent to each client device that result in a response received by the access node from the client device.

13. The method of claim 12, wherein the access node transmits the keep alive packets at a predetermined rate.

14. The method of claim 12, wherein the list is ordered.

15. The method of claim 12, wherein the access node transmits the keep alive packets randomly from the list.

16. The method of claim 12, further comprising communicating the link qualities to a system operator.

17. The method of claim 12, further comprising:
updating the list as new client devices are detected and old client devices are no longer detected.

18. The method of claim 12, wherein the access node is a gateway of the wireless mesh network.

19. An access point including processor and memory, the access point operative to:
detect all client devices associated with the access point, wherein detecting a client device comprises the access point performing a request and response exchange with the client device;
generate a list of the associated client devices;
transmit keep alive packets to each of the associated client devices according to the list;
count responses to the keep alive packets from each of the client devices; and
estimate a link quality of a wireless link between the access point and each client device based on the counted responses; wherein the estimates of link quality are based on a packet success probability as determined by a percentage of keep alive packets sent to each client device that result in a response received by the access point from the client device.

* * * * *